March 25, 1958 G. BRAND 2,827,975
VEHICLE POWER-STEERING MECHANISM
Filed April 6, 1954 2 Sheets-Sheet 1

INVENTOR
Glen Brand

BY
Cushman, Darby & Cushman
ATTORNEYS

March 25, 1958     G. BRAND     2,827,975
VEHICLE POWER-STEERING MECHANISM
Filed April 6, 1954     2 Sheets-Sheet 2
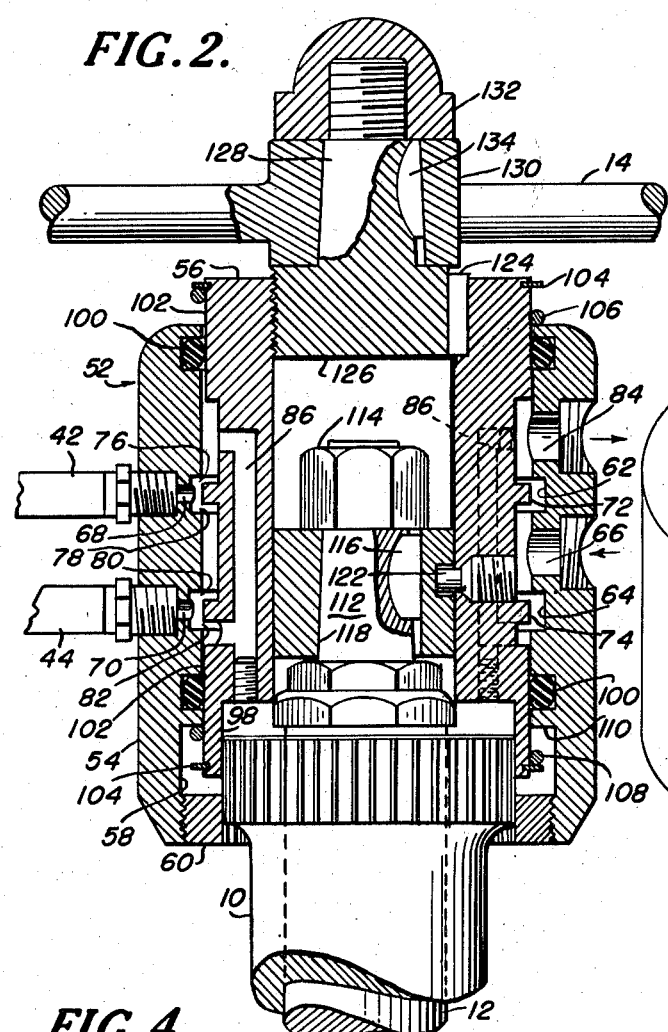
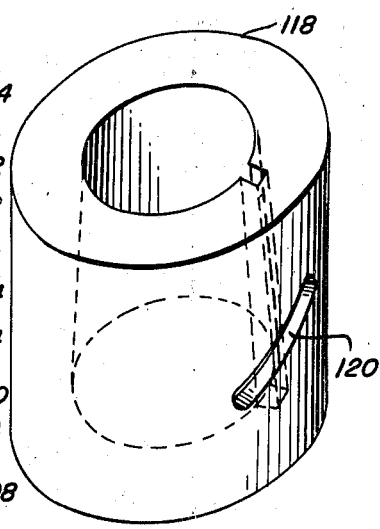
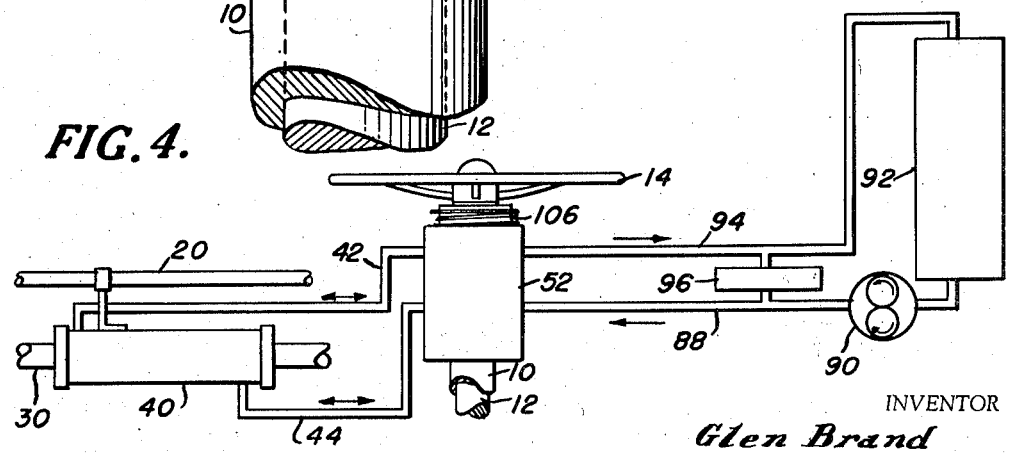
INVENTOR
*Glen Brand*
BY
*Cushman, Darby & Cushman*
ATTORNEYS United States Patent Office
2,827,975
Patented Mar. 25, 1958

2,827,975

VEHICLE POWER-STEERING MECHANISM

Glen Brand, Omaha, Nebr., assignor to Lion Products Company, Omaha, Nebr., a corporation of Nebraska Application April 6, 1954, Serial No. 421,291

8 Claims. (Cl. 180—79.2)

This invention relates to hydraulic power-steering mechanisms for vehicles, and more particularly to improvements in control-valve and power-cylinder arrangements of such mechanisms.

While hydraulic power-steering mechanisms for vehicles are well known, the valve arrangements for such mechanisms are usually relatively complicated and involve a multiplicity of parts, with consequent increases in costs of manufacture, installation, and maintenance. Furthermore, the power cylinders utilized in known power-steering mechanisms are usually in the form of a unit that is completely separate from and independent of the vehicle.

Accordingly, it is an object of this invention to provide an improved power-steering mechanism wherein the control valve is located immediately adjacent the steering wheel of the vehicle and is connected directly thereto for operation directly thereby.

It is another object of this invention to provide an improved power cylinder arrangement for a power-steering mechanism wherein the piston rod of such cylinder constitutes an integral part of the vehicle and serves a dual function, i. e., both as a piston rod and as an essential structural part of the vehicle.

It is another object of this invention to provide an improved power-steering mechanism for a vehicle that can be readily attached to an ordinary vehicle with a minimum of installation time and expense.

It is a further object of this invention to provide an improved power-steering mechanism for a vehicle that can be manufactured, installed, and maintained at a minimum of expense, and which when installed takes up a minimum of space on the vehicle.

Other objects and advantages of the invention will become apparent from the following description and accompanying drawings, in which:

Figure 2 is a fragmentary vertical sectional view of a control valve embodying this invention installed on the vehicle.

Figure 3 is an enlarged perspective view of the steering post adapter element shown in Figure 2.

Figure 4 is a schematic view of the hydraulic system of the power-steering mechanism embodying this invention.

Figure 1:
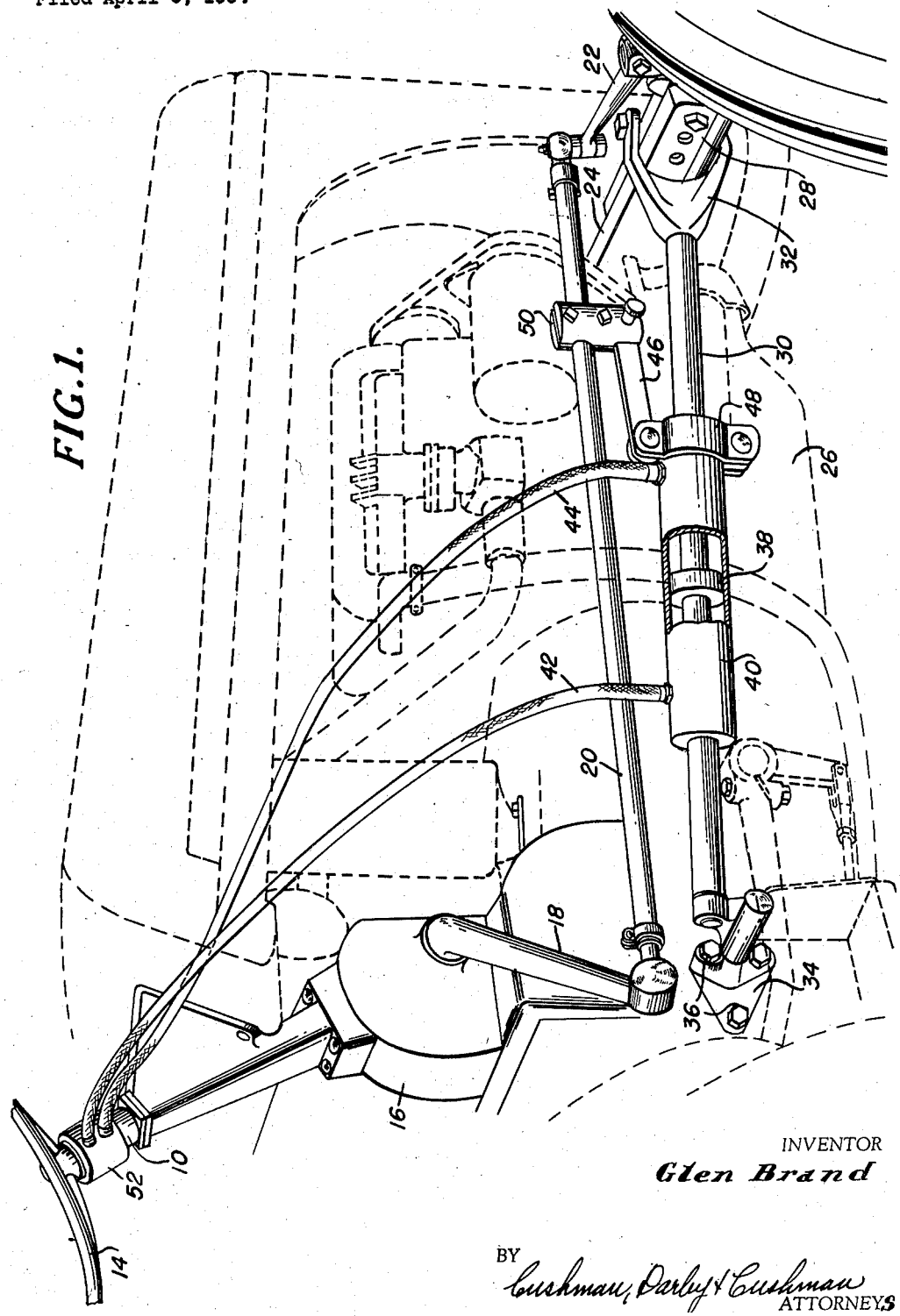
Figure 1 is a perspective view showing the installation of a power-steering mechanism embodying this invention on a tractor.

Referring now to Figure 1, there is shown power-steering mechanism embodying this invention installed on a tractor. The tractor has a conventional steering column or housing 10 within which a steering shaft 12 (Figure 2) is journalled for operation by a conventional steering wheel 14. The steering shaft 12, at its lower end, terminates in a housing 16 and operates conventional worm and gear means (not shown) therein to impart oscillating movements to a steering arm or crank 18. Connected to the steering arm is a drag link 20 which operates a steering lever 22.

The tractor illustrated in the drawings has a transverse front axle 24 that supports the tractor body or frame 26 only at the center of the axle, so that the projecting ends 28 of the latter need to be stabilized against drag forces thereon. In conventional tractors of the type illustrated in Figure 1, the front axle 24 is stabilized by braces (not shown), one on each side of the tractor, each having its forward end connected to the corresponding projecting end 28 of the axle and its rearward end pivotally connected to a rear portion of the tractor body 26.

In a power-steering mechanism embodying the present invention, the aforementioned brace on that side of the tractor where the drag link 20 is located is replaced by or formed as a piston rod 30. The forward end of the rod 30 is secured to a clevis 32 which straddles and is secured to the projecting end 28 of the front axle 24. The rear end of the piston rod 30 is pivotally connected to a bracket element 34 that is fastened, as by cap screws 36, to the side of the tractor body or frame 26. Thus, the piston rod 30 serves as a brace for one projecting end 28 of the front axle 24, as well as being an element of power-steering mechanism, as now described. Intermediate its ends, the piston rod 30 has a piston 38 fixed thereon. Slidable on the piston rod 30 and enclosing the piston 38 is a cylinder 40 having flexible conduits 42 and 44 connected thereto for admitting fluid pressure to and exhausting fluid pressure from the cylinder on opposite sides of the piston to effect corresponding movements of the cylinder on the rod. Movement of the cylinder 40 is transmitted to the drag link 20 to steer the tractor by a link 46 having one end thereof pivotally connected to a clamp 48 secured to the cylinder and the other end thereof pivotally connected to a clamp 50 secured to the drag link.

The flexible conduits 42 and 44 extend from the power cylinder 40 to a control valve 52 that is mounted coaxially on the steering column 10 and directly operated by steering movements of the steering wheel 14 to control the admission and exhaust of pressure fluid to and from the power cylinder 40 to effect movements thereof that will steer the vehicle in accordance with the dictates of steering movements of the steering wheel.

Referring now to Figure 2, it will be seen that the control valve 52 is of the spool type having a tubular casing 54 and a tubular valve spool 56 reciprocable therein. The lower end of the casing 54 has a counterbore 58 threadedly receiving an adapter ring 60 which has a pressed, preferably splined, fit with the upper end of the steering column or housing 10 to firmly secure the valve casing thereon. Although a pressed spline fit of an adapter ring is shown in the drawings, it will be understood that the valve casing 54 may be firmly secured on the steering housing 10 by any suitable means, e. g., threaded engagement between an adapter ring and the housing. The interior of the valve casing 54 is provided with a pair of axially-spaced circumferential grooves 62 and 64. A radial casing port 66 for the supply of fluid under pressure from an appropriate source is located substantially midway between these casing grooves 62 and 64, while the flexible conduits 42 and 44 leading to the power cylinder 40 are connected respectively to radial casing ports 68 and 70 opening to the bottom of the grooves 62 and 64, respectively. The valve spool 56 has a pair of axially-spaced lands 72 and 74 thereon opposed to the casing grooves 62 and 64, respectively, but narrower than the latter, to provide four variable annular fluid restrictions 76, 78, 80, and 82 between the side edges of the lands and the corresponding edges of the grooves. When the valve spool 56 is in the neutral position shown in Figure 2, all of the restrictions 76, 78, 80, and 82 are of equal value. Above the casing groove 62 is a radial casing port 84 for return flow of pressure fluid, as later described. The valve spool 56 is provided with one or more longitudinal passageways 86 which at their upper ends open to the surface of the spool above the upper land 72, and at their lower ends open to the surface of the spool below the lower land 74.

Pressure fluid is supplied to the casing port 66 via a flexible conduit 88 which may be connected to any appropriate source of fluid under pressure, such as a pump 90 supplied with fluid from a sump 92, as shown in Figure 4, while the return flow casing port 84 is connected to the sump via a flexible conduit 94. On the discharge side of the pump 90, a pressure relief valve 96 may be connected between the conduits 88 and 94 and adjusted to open at a predetermined pressure.

At its lower end the valve spool 56 is counterbored, as at 98, to freely telescopingly receive the upper end of the steering housing 10, and at its upper end the valve spool projects upwardly beyond the valve casing 54. The opposite ends of the valve 52 are sealed against leakage by O-rings 100 disposed in interior circumferential grooves in the valve casing 54 and engaging against end lands 102 on the valve spool 56. At its opposite ends the valve spool 56 is provided with exterior split rings 104 engaged in corresponding grooves. Interposed between the upper split ring 104 and the upper end of the casing 54 is a coil compression spring 106, while a like spring 108 is interposed between the lower split ring 104 and a shoulder 110 at the bottom of the casing counterbore 58. These springs 106 and 108 substantially balance the valve spool 56 against movement from the neutral position shown in Figure 2, wherein the lands 72 and 74 on the valve spool substantially equally underlap their corresponding casing grooves 62 and 64, so that all the fluid restrictions 76, 78, 80, and 82 are of equal value.

From the construction shown thus far, it will be seen that hydraulic fluid supplied to the casing port 66 is divided into two paths of flow through the valve 52 to the return flow port 84. One flow path includes the restriction 78, the groove 62, and the restriction 76, and the other flow path includes the restriction 80, the groove 64, the restriction 82, and the passageways 86. It thus will be seen that, when the valve is in the neutral position shown in Figure 2, incoming pressure fluid is divided substantially equally between the two aforementioned flow paths so that the pressure in the two grooves 62 and 64 are substantially the same. Thus, the pressures in the two flexible conduits 42 and 44, and consequently in the cylinder 40 on opposite sides of the piston 38, are substantially equal. Hence, the cylinder 40 remains stationary on the piston rod 30.

It will be seen, however, that if the spool 56 is moved axially relative to the casing 54, the aforementioned fluid restrictions 76, 78, 80, and 82 will be varied in a manner so that the pressures in the grooves 62 and 64, and consequently on opposite sides of the piston 38 in the cylinder 40, will be different. Thus, for example, if the spool 56 is moved up relative to the casing 54, the fluid restriction 76 will be increased and the restriction 78 will be decreased, while the fluid restriction 80 will be increased and the restriction 82 will be decreased. Thus, the pressure of the fluid in the groove 62 will increase, while the pressure of the fluid in the groove 64 will decrease, thus effecting differential pressures in the cylinder 40 on opposite sides of the piston 38 so that the cylinder will move on the piston rod 30, and, consequently, move the drag link 20.

Axial shifting of the spool 56 relative to the casing 54 in accordance with the movements of the steering wheel 14 is accomplished by the following mechanism. The valve spool 56 is tubular and encloses a steering post 112 on the upper end of the steering shaft 12. This post 112 usually is tapered, as shown, and terminates in an upper threaded portion for the reception of a nut 114. Fittingly and rigidly fixed on the steering post 112 by the nut 114 and a key 116 is what may be termed a "steering shaft adapter" 118 which consists of a bushing-like member having a cylindrical exterior surface provided with one or more relatively-short helical cam grooves 120 (Figure 3). Extending into the cam groove 120 from the valve spool 56 is a cam groove follower 122 in the form of a dog-point set screw. Threaded into the upper end of the valve spool 56 and secured against rotation relative thereto by a key 124 is a steering wheel adapter 126 having a tapered upwardly-projecting post 128 for the reception of the hub 130 of the steering wheel 14 that is rigidly secured to the adapter 126 by a cap nut 132 and a key 134.

It thus will be seen that rotation of the valve spool 56 in accordance with the steering movements of the steering wheel 14 shifts the spool axially relative to the valve casing 54, because of the interengagement of the cam follower 122 and the cam groove 120, to thus effect differential pressures in the cylinder 40 on opposite sides of the piston 38, which differential pressures will cause the cylinder to move and thereby move the drag link 20 in a direction corresponding to that of the steering movements of the steering wheel. The construction also embodies a follow-up mechanism, in that, when the steering wheel 14 is moved through a given arc, after the drag link 20 moves a corresponding distance it will stop because the movement of the latter effects a corresponding movement of the steering post 112 which, by the interengagement of the cam follower 122 with the cam groove 120, shifts the valve spool 56 axially back to its neutral position. Accordingly, the power cylinder 40 and the drag link 20 move only through a distance dictated by a corresponding movement of the steering wheel 14.

It thus will be seen that the objects of this invention have been fully and effectively accomplished. It will be realized, however, that the specific embodiment shown and described for the purpose of illustrating the principles of this invention is subject to change without departure from such principles. Therefore, this invention includes all modifications encompassed within the spirit and scope of the following claims.

I claim:

1. In a vehicle power-steering mechanism the combination comprising: a vehicle frame; an axle secured thereto and projecting from opposite sides thereof; a drag link extending generally longitudinally of said frame; a piston rod extending between and connected to said frame at a location thereon spaced longitudinally from said axle and to a projecting portion of said axle and serving as a brace for the latter; a piston on said rod between the ends thereof; a power cylinder slidable on said rod and enclosing said piston; means for introducing fluid under pressure into said cylinder on opposite sides of said piston; and a connection between said cylinder and said drag link for moving the latter by movement of said cylinder.

2. In a vehicle power-steering mechanism the combination comprising: a vehicle frame; a steering shaft mounted on said frame against axial movement; means movable by said shaft for steering the vehicle; a power cylinder member; a piston therein; a piston rod member projecting from said cylinder; one of said members being connected to said frame and the other to said movable steering means; a spool valve coaxial with and adjacent the steerable end of said shaft for controlling the admission and exhaust of pressure fluid to and from said cylinder on opposite sides of said piston, said valve having a casing element and a hollow valve spool element reciprocable therein and enclosing said shaft end; means within said valve detachably connecting said spool element to said shaft for relative axial movement therebetween on relative rotary movement therebetween; means detachably and rigidly connecting said casing element to said frame; and a steering wheel coaxially secured to said spool element.

3. The structure defined in claim 2 including an axle secured to the frame and projecting from opposite sides thereof, and in which the piston rod member projects from both ends of the cylinder and has one end secured to the frame at a point thereon spaced longitudinally from said axle and the other end to a projecting portion of said axle for bracing the latter, and the cylinder member is connected to the movable steering means.

4. In a vehicle power-steering mechanism having a power cylinder and a manually-operable steering shaft fixed against axial movement, the combination comprising: a spool valve coaxial with and adjacent the steerable end of said shaft for controlling the admission and exhaust of pressure fluid to and from the power cylinder, said valve having a casing element and a reciprocable hollow valve spool element therein enclosing said shaft end; means within said valve detachably connecting said spool element to said shaft for relative axial movement on relative rotary movement; means detachably and rigidly connecting said casing element to the vehicle frame; and a steering wheel coaxially secured to said spool element.

5. The structure defined in claim 4 including resilient means engaging the elements urging the one element into a neutral position relative to the other element.

6. In a vehicle power-steering mechanism having a power cylinder, a steering housing, and a steering shaft therein terminating in a steering post projecting out of the housing, the combination comprising: a spool valve coaxial with the post for controlling the admission and exhaust of pressure fluid to and from the cylinder, said valve having a casing and a hollow reciprocable valve spool therein enclosing the steering post; means rigidly secured to the post and having an exterior helical cam groove therein; a cam groove follower secured to said spool and projecting radially inwardly thereof into said groove; means detachably and rigidly connecting said casing to the housing; and a steering wheel coaxially and detachably secured to said spool.

7. A power-steering mechanism control valve attachment for a vehicle having a steering housing and a steering post projecting from one end thereof, comprising: a ported tubular valve casing; means for rigidly and detachably securing one end of said casing to the steering housing one end; a tubular valve spool reciprocable in said casing and adapted to enclose the post; a steering post adapter securable to the post and having an exterior helical cam groove; a cam groove follower projecting radially inwardly from said spool and into said groove; and a steering wheel adapter coaxially secured to one end of said spool.

8. The structure defined in claim 7 including resilient means engaged with the casing and spool for urging the latter into a neutral position in the former.

References Cited in the file of this patent

UNITED STATES PATENTS

| 729,737 | Collins | June 2, 1903 |
| 1,570,097 | Sumner et al. | Jan. 19, 1926 |
| 1,657,412 | Schneider | Jan. 24, 1928 |
| 1,926,692 | Tarbox | Sept. 12, 1933 |
| 2,151,998 | Stelzer | Mar. 28, 1939 |
| 2,213,271 | Davis | Sept. 3, 1940 |
| 2,334,918 | French | Nov. 23, 1943 |
| 2,368,135 | Hamill | Jan. 30, 1945 |

FOREIGN PATENTS

| 866,179 | France | June 27, 1941 |